United States Patent [19]

Krumel et al.

[11] 4,084,012
[45] Apr. 11, 1978

[54] EDIBLE OIL EMULSIONS

[75] Inventors: Karl L. Krumel, Midland, Mich.;
Trudy L. Krasnoff, Reading, Mass.;
Terry H. Fiero, Midland, Mich.

[73] Assignee: The Dow Chemical Company, Midland, Mich.

[21] Appl. No.: 628,452

[22] Filed: Nov. 3, 1975

[51] Int. Cl.$^2$ ................................................. A23 2/00
[52] U.S. Cl. ................................... 426/590; 426/604; 426/611; 426/613; 426/651; 426/654
[58] Field of Search ............... 426/590, 599, 604, 611, 426/612, 651, 654, 613

[56] References Cited

U.S. PATENT DOCUMENTS

| | | | |
|---|---|---|---|
| 2,906,626 | 9/1959 | Eagan et al. | 426/651 X |
| 3,119,699 | 1/1964 | Gunther | 426/599 X |
| 3,628,968 | 12/1971 | Noznick et al. | 426/651 X |
| 3,764,346 | 10/1973 | Noznick et al. | 426/651 |

*Primary Examiner*—Raymond N. Jones
*Assistant Examiner*—Esther M. Kepplinger
*Attorney, Agent, or Firm*—David B. Kellom

[57] ABSTRACT

Improved aqueous edible oil emulsions are obtained by using about 1-20 wt.% of certain water-soluble hydroxy-propylmethyl cellulose ethers as the emulsion stabilizer. These ethers have a thermal gel point of at least 70° C as a 2% aqueous solution, a methoxyl degree of substitution of about 1.12-1.56, a hydroxypropoxyl molar substitution of about 0.10-0.29, and a 2% aqueous solution viscosity of 2-15 cps at 20°C. They are particularly effective in stabilizing homogenized emulsions of citrus flavoring oils used in soft carbonated beverages.

6 Claims, No Drawings

EDIBLE OIL EMULSIONS

BACKGROUND

Many natural and synthetic flavoring oils are liquid combinations of highly volatile organic materials. To stabilize these materials, they are often prepared and used as concentrated aqueous emulsions. Many water-dispersible gums such as gum arabic, gum acacia and gum tragacanth, and modified starch and corn syrups have been used in liquid beverage emulsion and in spray dried foods such as cake mixes and gelatin desserts. Also water-soluble cellulose ethers including carboxymethyl cellulose, methyl cellulose and hydroxyethyl cellulose are effective stabilizers for many aqueous systems. Eagon & Greminger U.S. Pat. No. 2,906,626 describes edible oil emulsions stabilized with a combination of a water-soluble hydroxy-propylmethyl cellulose and propylene glycol.

Because of its surface active properties, film-forming characteristics, and ability to form highly concentrated solutions of moderate viscosity, gum arabic has found extensive use as an emulsifier for flavor oils and as a film-forming protective coating for many spray dried food products. However, the short supply of gum arabic has led to extensive research on synthetic replacements.

STATEMENT OF THE INVENTION

The technology of Eagon & Greminger U.S. Pat. No. 2,906,626 has been further advanced by the discovery of certain, very low viscosity cellulose ethers with viscosity concentration profiles and nearly Newtonian flow properties comparable to gum arabic. These low, 2-15 cps cellulose ether products have shown a broad range of applicability as stabilizers for flavor oil emulsions at levels of 20-50% that reported necessary with natural gums and starches. These new cellulose ether stabilizers have a thermal gel point of at least 70° C, preferably about 80°–100° C, as a 2% aqueous solution, a methoxyl degree of substitution (DS) of about 1.12-1.56, a hydroxypropoxyl molar substitution (MS) of about 0.10-0.29, and a 2% aqueous solution viscosity of 2-15 cps at 20° C. They are particularly effective as stabilizers for the flavor oil emulsions used in the preparation of cloudy carbonated beverages such as Fresca® or orange soda.

GENERAL DESCRIPTION

Suitable cellulose ethers for use herein are commercially available products. Particularly suitable are certain hydroxypropylmethyl cellulose ethers prepared by the process of Savage U.S. Pat. No. 2,831,852. They differ from the cellulose ethers used by Eagon & Greminger U.S. Pat. No. 2,906,626 in methoxyl and hydroxypropoxyl substitution, thermal gel point, and 2% aqueous solution viscosity as more fully described and exemplified below.

The essential low viscosity of these products, i.e., 2-15 cps as a 2% aqueous solution at 20° C, can be obtained by etherification of a low molecular weight cellulose substrate as disclosed by Richter U.S. Pat. No. 2,112,116 and Klug ea U.S. Pat. No. 2,512,338. Alternatively the viscosity of a hydroxypropylmethyl cellulose of desired substitution can be reduced to the required 2-15 cps by terminal treatment with HCl as taught by Reid ea U.S. Pat. No. 1,864,554 or with $H_2O_2$ as described by Savage U.S. Pat. No. 3,728,331.

The use of propylene glycol as an emulsion slurry aid as described by Eagon & Greminger U.S. Pat. No. 2,906,626 is generally desirable. The propylene glycol effectively increases the compatibility of the edible flavoring oil and cellulose ether.

These ingredients, the flavoring oil, cellulose ether, and propylene glycol may be employed in a wide range of proportions. Stable emulsions containing up to 30 wt.% or more of the edible oil may be prepared. Preferably the emulsions will contain about 5-25 wt.% of the oil since these are most useful and stable.

The low viscosity cellulose ether should be employed at a concentration of at least 1 wt.% and preferably about 2-20 wt.%. The optimum concentration will depend of course on the specific system.

The propylene glycol should be used in a concentration of about 5-30 wt.%, preferably about 5-20 wt.%. Little added stability is obtained with less than 5%, and no additional benefits are obtained with the use of more than 30 wt.% propylene glycol.

Within the preferred range of about:
5-25 wt.% edible oil,
2-20 wt.% of the low viscosity cellulose ether, and
5-30 wt.% propylene glycol
very stable emulsions can be obtained, particularly when the aqueous glycol mixture is homogenized to an average emulsion particle size of about 0.5-2.0 microns, preferably about 1±0.2 microns as desired for use in the preparation of cloudy carbonated beverages. They retain their taste, odor, and dispersed phase for prolonged periods.

The following examples will further illustrate the improved edible oil emulsion. Unless otherwise indicated, all parts and percentages are by weight. The cellulose ether analyses and viscosities are determined by standard methods as described in ASTM methods D-1347-64 and D-2363-65T.

EXAMPLE 1

Citrus Concentrate Formulations

Flavor concentrates for cloudy citrus beverages, such as Fresca® and orange soda are typically prepared as follows:

A. Emulsion Concentrate

Although the exact formulations are many and varied, a good representative contains (Formulation 1):

| Ingredient | Amount* |
|---|---|
| Gum Arabic | 1.0 lb/gal – 120 g/l |
| Flavor Oil | 1.0 lb/gal – 120 g/l |
| Propylene Glycol | 1.2 lb/gal – 144 g/l |
| Citric Acid | 4 g/gal – 1.06 g/l |
| Sodium Benzoate | 4 g/gal – 1.06 g/l |
| Water | Balance to Volume |

*Calculated for 1 gallon or 1 liter of flavor concentrate

The gum and salts are wetted out with the oil and propylene glycol and the water was added while stirring. The mixture is stirred until the polymer is dissolved and then was homogenized in two passes typically using a Manton Gaulin homogenizer at 2500 psi.

In this study the preceding formulation was used except that the gum type and concentration were varied. The flavoring oil used was a mixture of 52.9% W/W orange oil (d = 0.83 g/ml) and 47.1% W/W brominated vegetable oil (d = 1.33 g/ml) and had a density of 1.02 g/ml. Such mixtures of flavor oil and a more dense oil such as a brominated vegetable oil are commonly used to increase the density of the flavor oil to avoid any ringing caused by separation of the oil from the aqueous phase.

B. Syrup Concentrate

The emulsion is then diluted 100–400 times with a 60–70% solution of sugar in water. This syrup is then diluted five to seven times with water or carbonated water to give the final soft drink.

For this study the syrup concentrate (Formulation 2) was prepared as follows:

A solution of 670 g sugar, 5 g of citric acid and one g of sodium benzoate was made up to one liter with water and then 2.0 cc of flavor oil emulsion was added while stirring. After complete mixing, the diluted emulsion was homogenized at 1500 psi.

The quality of the resulting syrup concentrate was evaluated in terms of quality and stability of the haze and the ease of solution makeup. However, no attempt was made to evaluate the final beverage in terms of mixing or taste characteristics.

EXAMPLE 2

Stage 1 Screening Evaluation

Table I summarizes typical data from Stage 1 evaluation tests with several standard gum products and three different types of commercial cellulose ethers. The emulsions were prepared using Formulation 1 with the gum or cellulose ether as the only variable. They were homogenized at 3000 psi with continuous recycle. The resulting emulsions were stored at room temperature (22°–25° C) and at 50° C for 3 months. If the emulsions retained droplet size and showed no serious separation or evidence of creaming the emulsions were considered stable.

The results given in Table I indicate that good stability is obtained with 0.4 lb/gal (48 g/l) or less of a hydroxypropylmethyl cellulose (HPMC) while concentrations of more than 1.0 lb/gal (120 g/l) are commonly recommended for gum arabic and modified starches. The emulsion from Sample HPMC-K3.7 was rated excellent in overall quality and stability.

TABLE I

THE STABILITY OF FLAVOR OIL EMULSIONS USING VARIOUS NATURAL AND SYNTHETIC GUMS AS STABILIZERS

| Run | Gum/CE* | Conc. lb/gal | Emulsion Stability 22-25° | 50° | Dropsize 50° C |
|---|---|---|---|---|---|
| 1-1 | Gum Arabic | 1.0 | Stable | Stable | <1 μ Uniform |
| 1-2 | Gum Arabic | 0.5 | " | Stable | <1 μ Uniform |
| 1-3 | Modified Starch A | 1.0 | " | Stable | <1 μ Uniform |
| 1-4 | Modified Starch B | 1.0 | — | Stable (2 mos) | 1–4 μ Not Uniform |
| 1-5 | HPC-E | 0.5 | — | Rapid Sep. | — |
| 1-6 | HPMC-E15 | 0.43 | Stable | Stable | ~3 μ Uniform |
| 1-7 | HPMC-E15 | 0.2 | " | Stable | ~2 μ Uniform |
| 1-8 | HPMC-E15 | 0.2 R | " | Stable (2 mos) | ~2 μ Uniform |
| 1-9 | HPMC-E15 | 0.1 | " | Stable | 1–2 μ Not Uniform |
| 1-10 | HPMC-E15 | 0.1 R | " | Stable (2 mos) | 1 μ Uniform |
| 1-11 | HPMC-E15 | 0.075 | " | Stable | <1 μ Fairly Uniform |
| 1-12 | HPMC-E5.5 | 0.5 | " | v. sl. creaming (2 mos) | ~1 μ Fairly Uniform |
| 1-13 | HPMC-E5.5 | 0.2 | " | Stable | <1 μ Fairly Uniform |
| 1-14 | HPMC-E4.3 | 1.0 | " | Cream (6 wks) | — |
| 1-15 | HPMC-E4.3 | 0.5 | " | Stable | ~1 μ Non Uniform |
| 1-16 | HPMC-E4.3 | 0.2 | " | Stable | 1–3 μ Non Uniform |
| 1-17 | HPMC-E2.4 | 1.0 | " | Creamed (2 mos) | — |
| 1-18 | HPMC-E2.4 | 0.5 | " | Stable | <1 μ Uniform |
| 1-19 | HPMC-K3.7 | 0.5 | " | Stable | <1 μ Uniform |

*Commercial Gum or Cellulose Ether Products
Modified Starch A - Sterimul (H. Kohnstamm & Co., Inc.)
Modified Starch B - Purity Gum BE (National Starch & Chem. Corp.)
HPC-E - Klucel E (Hercules, Inc)
HPMC-E - Methocel E (Dow Chemical Company) 28–30% MeO (1.79–2.03 DS); 7–12% HPO (0.20–0.34 MS); Thermal gel point - 60° C; 2% viscosity indicated by number after E
HPMC-K - Methocel K (Dow Chemical Company) 19–24% MeO (1.12–1.56 DS); 4–12% HPO (0.10–0.29 MS) Thermal gel point - 90° C; 2% viscosity - 3.7 cps.

EXAMPLE 3

Stage II Evaluation

Based on data reported in Example 2, the more effective emulsion stabilizers were evaluated further under conditions more closely approaching actual field use by homogenizing the emulsion in two passes rather than continuously and by evaluating the emulsions ability to properly mix into sugar solutions. These experiments were performed with 5 test materials including gum arabic and the hydroxypropylmethyl cellulose (HPMC-E) used by Eagon & Greminger U.S. Pat. No. 2,906,626. Formulation 1 was again used for the emulsion concentrate.

A. Typical results are given in Table II. Only the hydroxypropylmethyl cellulose HPMC-K3 and HPMC-E3 homogenized as easily as gum arabic establishing the importance of the extremely low viscosity of these products. Subsequent tests established that a 2% aqueous solution viscosity range of about 3–5 cps is the product of choice for stabilizing citrus flavor oil emulsions. However, acceptable results can be obtained with products having a viscosity within the range of 2–15 cps. Higher viscosities do not give the desired stability with 1–2μ droplets, particularly at 50° C. Also a concentration range of cellulose ether of about 0.1–1.0 lb/gal (12–120 g/l) in the emulsion concentrate is workable. However, a concentration of about 0.25–0.4 lb/gal (30–48 g/l) is preferred.

TABLE II

THE EVALUATION OF THE STABILITY OF FLAVOR OIL EMULSIONS PREPARED USING THE DOUBLE-PASS HOMOGENIZATION TECHNIQUE

| Run | Gum/CE* | Conc. lb/gal | Emulsion Stability at 25° C | Dropsize |
|---|---|---|---|---|
| 2-1 | Gum Arabic | 1.0 | Stable (2 weeks) | ~1 μ |
| 2-2 | Modified Starch A | 1.0 | Stable (2 weeks) | ~1 μ |
| 2-3 | HPMC-E15 | 0.25 | Sl. separation | — |

TABLE II-continued

THE EVALUATION OF THE STABILITY OF FLAVOR OIL EMULSIONS PREPARED USING THE DOUBLE-PASS HOMOGENIZATION TECHNIQUE

| Run | Gum/CE* | Conc. lb/gal | Emulsion Stability at 25° C | Dropsize |
|-----|---------|--------------|-----------------------------|----------|
| 2-4 | HPMC-E15 | 0.1 | Sl. separation (2 weeks) | — |
| 2-5 | HPMC-E15 | 0.075 | Sl. separation (2 weeks) | 1-2 μ |
| 2-6 | HPMC-E3 | 0.5 | Stable (2 weeks) | — |
| 2-7 | HPMC-K3 | 0.5 | Stable (2 weeks) | 1-2 μ |
| 2-8 | HPMC-K3 | 0.2 | Stable (2 weeks) | 1 μ uniform |

*cf Table I

B. The emulsions listed in Table 2 were then tested in Formulation 2 to determine how they would mix into a sugar solution and whether the resulting cloudy syrups retained a stable haze upon standing. The results showed that only the HPMC-K3 emulsion yielded a stable haze comparable to gum arabic and Sterimul. The HPMC-E15 and E3 emulsions separated out as a layer on top of the clear sugar solution within 24 hours, thus indicating a basic instability of the polymer to the high concentration of sugar.

Based on the above results, HPMC-K with a 2% aqueous solution viscosity of 2-15 cps, preferably about 3-5 cps, is an improved cellulose ether product of choice for stabilizing flavor oil emulsions, and particularly flavor oil emulsions to be used in cloudy citrus beverages with orange, lemon and lime flavor oils.

We claim:

1. A cloudy citrus beverage syrup consisting essentially of an emulsion of:
   (a) 1-30 wt. % edible citrus flavoring oil,
   (b) 1-20 wt. % of a water-soluble hydroxypropylmethyl cellulose ether having a methoxyl degree of substitution of about 1.12-1.56, a hydroxypropoxyl molar substitution of about 0.10-0.29, a thermal gel point of at least 70° C, and a 2% aqueous solution viscosity of 2-15 cps at 20° C,
   (c) 5-30 wt. % of propylene glycol, and
   (d) water dispersed in an aqueous sugar solution.

2. The cloudy citrus beverage syrup of claim 1 where the cellulose ether has a thermal gel point of about 80°-100° C.

3. The cloudy citrus beverage syrup of claim 1 where the cellular ether has a 2% aqueous solution viscosity of about 3-5 cps at 20° C.

4. The cloudy citrus beverage syrup of claim 1 where the edible flavoring oil is homogenized to an average emulsion particle size of about 0.5-2.0 microns.

5. In a process for preparing a stable edible oil emulsion syrup for use in cloudy beverages, the improvement consisting of dispersing an edible oil emulsion consisting of:
   (a) 1-30 wt. % edible oil,
   (b) 1-20 wt. % of a water soluble hydroxypropyllmethyl cellulose ether having a methoxyl degree of substitution of about 1.12-1.56, a hydroxypropoxyl molar substitution of about 0.10-0.29, a thermal gel point of at least 70° C, and a 2% aqueous solution viscosity of 2-15 cps at 20° C,
   (c) 5-30 wt. % of propylene glycol, and
   (d) water in an aqueous sugar solution.

6. The process of preparing the stable edible oil emulsion syrup of claim 5 where the cellulose ether has a thermal gel point of about 80°-100° C and a 2% aqueous solution viscosity of about 3-5 cps at 20° C.

* * * * *